June 4, 1968 R. F. HUNTER 3,386,914
PROCESS OF REMOVING A COMPONENT FROM A FLUID
Filed Jan. 24, 1966 2 Sheets-Sheet 1

INVENTOR.
ROBERT FREDERICK HUNTER
BY~
Rogers & Bereskin

United States Patent Office 3,386,914
Patented June 4, 1968

3,386,914
PROCESS OF REMOVING A COMPONENT FROM A FLUID
Robert Frederick Hunter, 2351 1st St.,
Burlington, Ontario, Canada
Continuation-in-part of application Ser. No. 428,901,
Jan. 29, 1965. This application Jan. 24, 1966, Ser.
No. 522,741
19 Claims. (Cl. 210—35)

ABSTRACT OF THE DISCLOSURE

Process of treating a fluid such as tap water or sea water to remove a component such as calcium or magnesium ion from the fluid in which the fluid is passed through a fixed bed of particles such as ion exchange resin particles and the bed is regenerated by passing a regenerant fluid through the bed. The fluids used in the process are passed through the bed at a rate of flow and for a period of time such that at least 50% of the length of the bed in contact with the fluid to be treated during the fluid treatment step is actively taking up the component from the fluid to be treated and/or at least 50% of the length of the bed in contact with the regenerant fluid during the regeneration step is actively giving up the component to the regenerant fluid.

---

Figure 1:
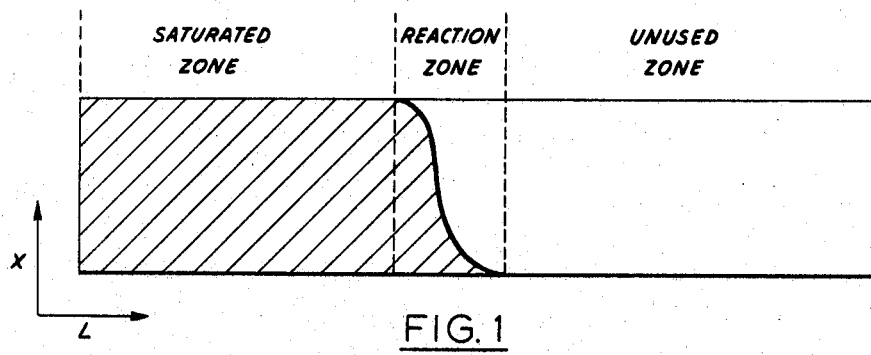

This application is a continuation-in-part of my application No. 428,901 filed Jan. 29, 1965 for Process of Operating Fluid Beds of Active Media and the present application relates to a process of treating a fluid containing a component to remove at least a part of the component from the fluid by passing the fluid through a fixed bed of particles capable of taking up the component from the fluid.

Processes of this type are well known and are generally used with a bed of ion exchange or other absorptive particles to purify or extract valuable chemicals from a wide variety of fluids. One of the main applications of such processes is the softening of tap water or sea water to remove scaling components such as calcium and magnesium by means of a bed of cation exchange resin particles.

A process of this type may be used, for example, to remove the undersirable calcium cation from hard water by passing the hard water through a bed of sodium cation exchange resin particles.

The resin particles take up the calcium ions from the hard water solution by exchanging for them an equivalent amount of sodium ions. Sodium ions from the resin are given up to the hard water solution and replaced on the resin by calcium ions from the solution. The capacity of the resin to take up calcium ions is limited, and after the hard water solution has been passed through the bed for a period of time, the bed will become saturated, and will no longer be capable of taking up calcium ions from the hard water solution.

However, the capacity of the bed can be restored by passing another solution through the bed which is known as the regenerant. An aqueous solution of sodium chloride is commonly used for this purpose. The regenerant solution will exchange sodium ions for the calcium ions of the resin. Calcium ions from the resin are given up to the regenerant solution and are replaced by sodium ions from the regenerant solution.

The process of transferring calcium ions from the hard water solution to the resin is known as the fluid treatment step, and the process of transferring the calcium ions from the resin to the regenerant solution is known as the regeneration step.

It is usual to carry out processes of this type in cycles including:

(a) the fluid treatment step in which the fluid to be treated is passed through the bed until the bed is no longer capable of taking up the component from the fluid
(b) rinsing of the bed if a valuable fluid is being treated
(c) back-washing of the bed to remove fouling material
(d) the regeneration step in which a fluid capable of taking up the component from the bed is passed through the bed until the bed is restored to its original form
(e) rinsing of the bed to remove excess regenerant fluid.

The regenerant fluid may be passed through the bed in the same direction as the fluid to be treated (co-current) or in the opposite direction (counter-current).

As indicated above, processes of this type are well known. However, they have not found wide acceptance for large scale industrial use because of the high capital cost of the necessary equipment.

One of the main costs of the processes is the cost of the resin or other material used in the bed, and it is an object of the invention to reduce the quantity of bed material necessary to perform a given component removal operation.

Figure 2:
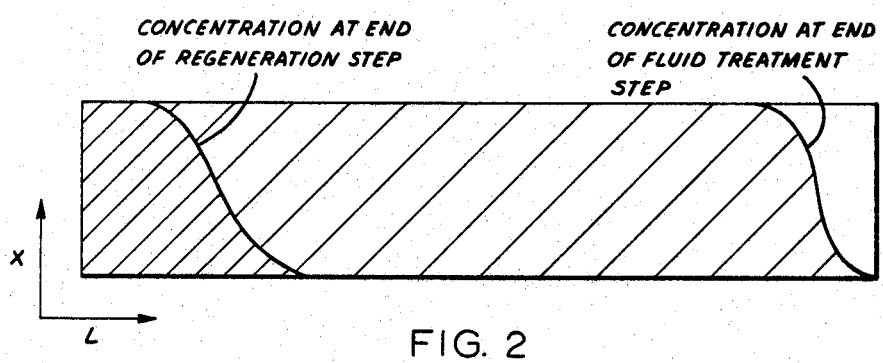
Figure 3:
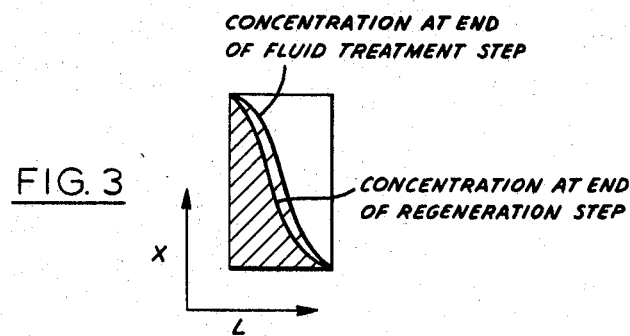
Figure 4:
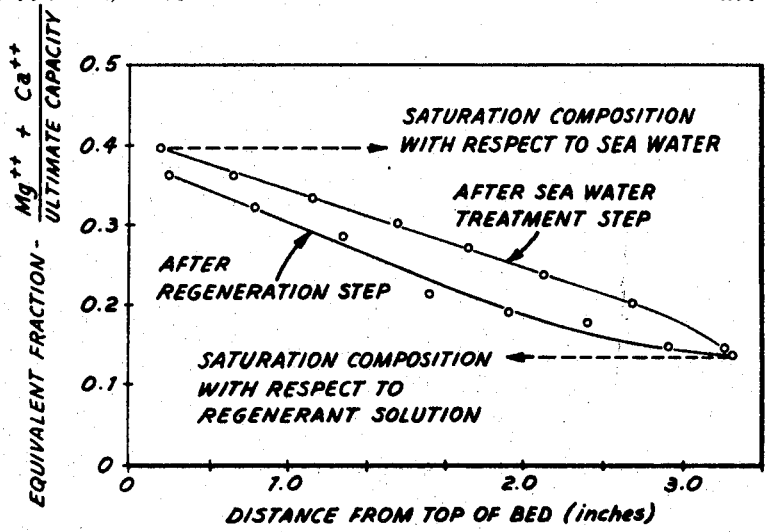
Figure 5:
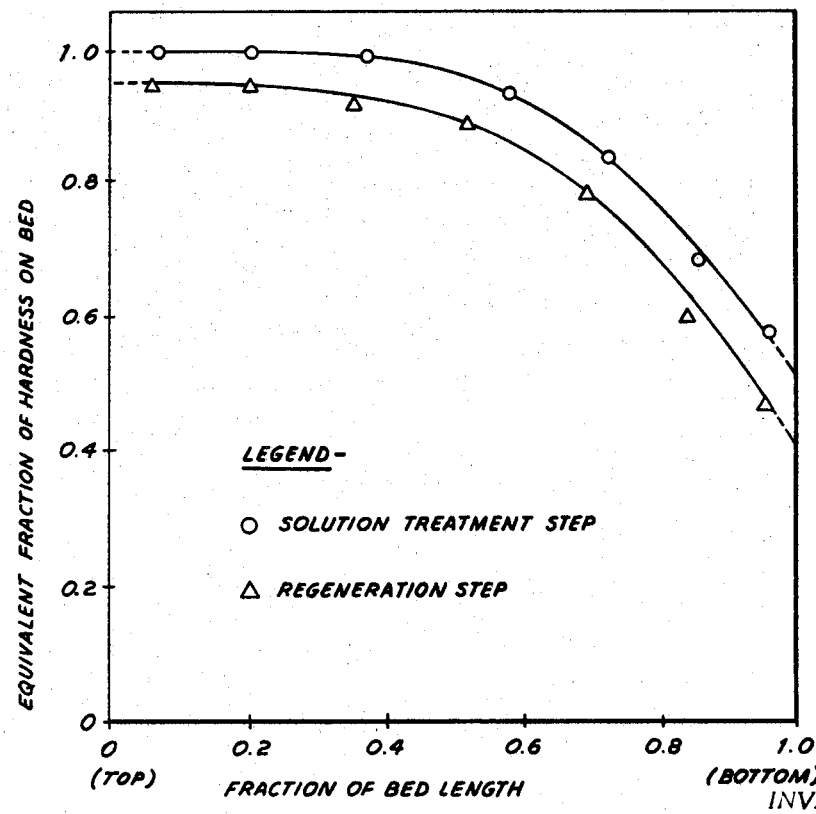

Other objects and advantages of the invention will appear from the following description and the accompanying drawings in which:

FIGURE 1 is a plot of the concentration of the component in the bed against the length of the bed for a conventional fixed bed operation, FIGURE 2 is a plot of the concentration of the component in the bed against the length of the bed for a conventional fixed bed operation with counter-current regeneration, FIGURE 3 is a plot of concentration of the component in the bed against the length of the bed for operation of a fixed bed in accordance with this invention, FIGURE 4 is a plot of $Mg^{++}+Ca^{++}$ concentration against the length of the bed for the process of Example 1, FIGURE 5 is a plot of total hardness concentration against the length of the bed for the process of Example 2.

The amount of bed material necessary to perform a given component removal operation will be decreased if there is an increase in the average rate of take-up of component from the fluid to be treated per unit volume of bed material over the whole cycle of operation.

Little consideration has previously been given to the average rate of take-up of the bed material, and the present invention is based on a consideration of the conditions influencing the average rate of transfer of bed material and the optimization of those conditions. The conditions influencing the average rate of transfer of bed particles will be examined with reference to the conventional process of water softening. For simplicity the process will be examined on the basis that only calcium ion is being removed from the hard water solution, but of course, in practice, other ions such as magnesium will also be removed from the hard water.

Conventional water softening on an industrial scale is carried out by passing the hard water through a large bed of sodium cation exchange resin four to eight feet in length. As the hard water is passed through the bed, the calcium ion will first be taken up by the bed at the end of the bed through which the hard water enters. As the calcium ion is being taken up by this portion of the bed there will be little take-up taking place throughout the rest of the length of the bed. Almost all of the calcium ion which can be taken up by the bed particles will be taken up by the first portion of the bed as long as it remains capable of taking up calcium ions from the hard water. The first part of the bed in which the calcium ion is being actively taken up by the bed can be termed the reaction zone.

As the process is continued and more hard water is passed through the bed, calcium ions will continue to be taken up by the first part of the bed until it is no longer capable of taking up calcium ions from the fluid, or expressed another way, until this part of the bed is saturated or in equilibrium with the hard water solution passing through it. When this stage is reached, calcium ion will be taken up by the next part of the bed, and as more hard water is passed through the bed, the reaction zone gradually moves down the length of the bed until substantially the whole length of the bed is saturated with calcium ion and the bed is no longer capable of taking up calcium ions from the hard water.

After the bed is saturated with calcium ions there is a back-wash step to break up and wash out the partially cemented deposits of calcium or other substances, and this is followed by the regeneration step in which a concentrated solution of sodium chloride in water is passed through the bed to take up calcium ions from the bed. The regeneration step is similar to the solution treatment step in that a relatively narrow reaction zone passes down the length of the bed in which calcium ions are being actively taken up by the regenerant solution. The regeneration is carried out until substantially the whole length of the bed is no longer capable of giving up calcium ions to the regenerant solution, or expressed another way, until the bed is saturated with respect to or in equilibrium with the regenerant solution.

The regeneration step is usually followed by a rinse step to remove any excess regenerant left in the bed.

The operation of conventional fixed beds of this type can be illustrated by reference to FIGURES 1 and 2 which are plots of the concentration C of the component in the bed against the length of the bed L.

FIGURE 1 shows the concentration of the component in the bed at a point of time during the fluid treatment step. At this point of time it can be seen that part of the bed is saturated with the component, part of the bed is unused, and part of the bed is in the reaction zone.

The bed particles in the saturation zone are no longer capable of actively taking up the component from the fluid to be treated, and the bed particles in the unused zone are contacting only fluid from which the component has been removed to the extent that the bed particles are capable of taking up the component from the fluid.

In neither of these zones are the bed particles actively taking up component from the fluid to be treated at that particular point in time. At that point in time it is only the bed particles in the reaction zone that are actively taking up component from the fluid to be treated. The reaction zone moves through the length of the bed during the fluid treatment step, but at any particular time during the step it is only the bed particles in the reaction zone that are actively taking up component from the fluid to be treated.

In the conventional process, the reaction zone will be only a small fraction of the total length of the bed and thus the average rate of take-up for each unit of volume of bed particles for the total time of the fluid treatment step will be very low.

FIGURE 2 shows the concentration of the component in the bed at the end of the fluid treatment step and at the end of the regeneration step in the case where counter-current regeneration is used. During the fluid treatment step the reaction zone in which the component is being actively taken up from the fluid to be treated moves from left to right through the bed. During the regeneration step the reaction zone in which component is being actively given up to the regeneration fluid moves from right to left through the bed. In the operation shown in FIGURE 2 the fluid treatment step has been stopped just short of complete saturation and the regeneration step has been stopped just short of complete regeneration.

On the basis of the above examination of the conditions which exist during the fluid treatment and regeneration steps in the conventional process, a process has been devised which results in a substantially increased average rate of take-up of the component to be treated per unit volume of bed material over the whole cycle of operation, and in a substantial reduction in the amount of bed material necessary to perform a given component removal operation.

According to the process of the invention, the fluid to be treated and/or the regenerant fluid is passed through the bed at a rate of flow and for a period of time such that at least 50 percent, and preferably 75 percent, of the length of the bed in contact with the fluid being passed through the bed is in the reaction zone throughout the step. In the case of the fluid treatment step, this means that at least 50 percent, preferably 75 percent, of the length of the bed in contact with the fluid to be treated is actively taking up the component from the fluid to be treated throughout the fluid treatment step. In the case of the regeneration step, this means that at least 50 percent, preferably 75 percent, of the length of the bed in contact with the regenerant fluid is actively giving up component to the regenerant fluid during the regeneration step.

The effect of increasing the length of the reaction zone can be illustrated with reference to FIGURE 3 which shows the concentration of the component in the bed at the end of the fluid treatment and regeneration steps in a process carried out in accordance with the principles of this invention using counter-current regeneration. It can be seen that during the fluid treatment step substantially all of the whole length of the bed is not saturated with respect to either the fluid to be treated or the regenerant fluid, and thus substantially the whole length of the bed in contact with the fluid to be treated is actively taking up component from the fluid to be treated throughout the fluid treatment step.

This means that there will be an increase in the average rate of take-up for any particular unit volume of bed material for the fluid treatment step. The full cycle includes the fluid treatment step, the regeneration step, and any rinse or back-wash steps. By increasing the average rate of transfer per unit volume of bed material for the fluid treatment step there will be an increase in the average rate of transfer per unit volume of bed material for the whole cycle if there is no increase in the proportion of time required for the regeneration, rinse and back-wash steps.

In the system illustrated in FIGURE 3, the regeneration step is also carried out so that substantially the whole length of the bed is not saturated with respect to either the fluid to be treated or the regenerant fluid, and thus substantially the whole length of the bed in contact with the regenerant fluid is actively giving up component to the regenerant fluid throughout the regeneration step.

This means that there will be an increase in the average rate at which a particular unit volume of bed material gives up component to the solution. This results in a decrease in the time for the regeneration step and hence a decrease in the total time of the cycle, and will thus result in an increase in the average rate of take-up of component per unit volume of bed material over the whole cycle. The process of the invention may be used only on the regeneration step or only on the fluid treatment step, and in either case it will result in an increase in the average rate of take-up of component by the bed material. If both steps are carried out in accordance with the process of the invention as in the operation illustrated in FIGURE 3, the average rate of take-up will be further increased, and preferably the component removal operation is carried out in this manner.

In FIGURES 1, 2 and 3, the horizontal line at the top represents the bed concentration at saturation or equilibrium with respect to the fluid to be treated. At this bed concentration, the bed will not actively take up component from the fluid to be treated. The horizontal line at the bottom of FIGURES 1, 2 and 3 represents the bed concentration at saturation or equilibrium with respect to the regenerant fluid. At this concentration the bed will not actively give up component to the regenerant fluid.

It can be seen that during the fluid treatment and regeneration steps, the concentration of component in the bed varies between the two limits. In the operation illustrated in FIGURE 1, the concentration of component in the bed is equal to the concentration of saturation with respect to the fluid to be treated in the saturation zone, and in the unused zone is equal to the concentration of saturation with respect to the regenerant fluid. In the reaction zone the concentration varies between the two limits.

It can be said that there is a bed composition profile when the concentration of the component in the bed is not at either of the two saturation values. Thus, in the operation illustrated in FIGURE 1 there is a profile in the reaction zone but not in the saturation or unused zones. In carrying out this invention it is preferred that the profile extend through substantially the whole of the length of the bed as in the operation illustrated in FIGURE 3. It is preferred to have the extended profile in both the regeneration and fluid treatment steps, but advantages are obtained where the profiles are present in either the regeneration or fluid treatment steps.

The horizontal lines in FIGURES 1, 2 and 3 refer to the saturation concentration with respect to fresh regenerant and untreated fluid. In practice the concentration of the component in both the fluid to be treated and the regenerant fluid will change as the fluid in question passes through the bed. Thus, as the fluid to be treated passes through the bed, the concentration of the component in the fluid will decrease, and hence at any point in the bed there will be a concentration of component in the bed at which the bed is saturated with respect to the fluid passing through that part of the bed at any particular time. When this concentration exists there will be no active take-up of component from the fluid to be treated. The same applies to the regeneration step in which there will be no active take-up of component by the regenerant fluid at any point where the bed is saturated with respect to the regenerant fluid passing through it.

It is preferred that the fluid treatment step is carried out at a rate of flow and for a period of time such that substantially the whole of the length of the bed in contact with the fluid to be treated is actively taking up component from the fluid to be treated throughout the step, and that the regeneration step is carried out at a rate of flow and for a period of time such that substantially the whole of the length of the bed in contact with the regenerant fluid is actively giving up the component to the regenerant fluid throughout the step.

As compared to the conventional process discussed above, the carrying out of the invention will require an increase in the rate of flow and/or a decrease in cycle time and/or a decrease in the length of the bed. Ideally the maximum average rate of transfer would be achieved by having an infinitely fast rate of flow, an infinitely short cycle time, or an infinitely short bed length. In practice it is of course not possible to achieve these ideal conditions. However, ideal conditions may be approached in practice by suitable adjustment of the flow rate, cycle time and/or bed length.

The maximum possible flow rate is limited by the pumping cost and problems of bed containment. However, it is possible to use higher flow rates than those normally used in the conventional process. The time of cycle must be sufficient to allow a finite volume of fluid to pass through the bed, but cycles very much shorter than those used in present practice can be used. The bed length must be sufficient to perform the required transfer of component. With an infinitely short bed there would be no change in the concentration of component in the fluid to be treated in the fluid treatment step, and no change in the concentration of the bed during the regeneration step. Therefore, the bed must of course be of sufficient length to perform a useful component removal operation. However, the bed lengths may be much shorter than those used according to conventional practice.

In a fluid treatment step or a regeneration step in accordance with this invention, when the fluid being passed through the bed is passing through the whole length of the bed, at least 50% of the length of the bed is active with respect to that fluid. It will be obvious that at the first part of any step at least 50% of the length of the bed cannot be active with respect to that fluid since only a small fraction of the length of the bed is in contact with that fluid. However, the objects of the invention are achieved if at least 50% of the length of the bed in contact with the fluid being passed through the bed in a step is active with respect to that fluid.

In most cases conventional operations include a backwash step after the solution treatment step to remove cemented deposits from the bed. With the process of this invention a shorter cycle time is used which does not allow time for deposits to become cemented to the bed particles, and the back-wash step can in most cases be eliminated. This reduces the total time of a complete cycle without increasing the time of the fluid treatment step resulting in a further increase in the average rate of transfer per unit volume of bed material over the whole cycle.

In some cases it will be possible to carry out the process of the invention without any decrease in bed length by a suitable increase in flow rate. However, the use of high flow rates involves high pumping costs and problems of bed containment, and it will generally be necessary to substantially reduce the length of the bed in order to carry out the process of the invention. The shortening of the bed results in a reduction in pumping costs, and the use of short bed lengths which are preferred to increase the average rate of transfer per unit volume of bed material over the whole cycle will therefore provide the additional advantage of a reduction in pumping costs.

The shorter bed lengths, resulting in a lower pressure drop across the bed also makes possible the use of smaller sized bed particles. It is well known that smaller sized bed particles will increase the transfer rate between the component and the fluid by providing more surface area for the same volume of resin, but small particles have not been widely used because the high pressure drop in conventional long beds results in problems of bed containment. Thus the use of short beds makes possible the use of small bed particles which causes an increase in the rate of transfer per unit of flow area and results in a further increase in the average rate of transfer per unit volume of bed material in both the fluid treatment and regeneration steps.

It is preferred to pass the fluids through the bed vertically since this results in a more uniform distribution throughout the bed. The invention may be used with either co-current or counter-current regeneration but it is advantageous to use counter-current regeneration.

The invention may be used with either gases or liquids but its principal practical application will be to systems wherein both the fluid to be treated and the regenerant fluid are liquids. With liquid systems a bed length less than two feet and preferably less than six inches will give good results. With beds of this length bed particles of a size from about 50 to about 200 U.S. Tyler mesh can be used to good advantage.

In my co-pending U.S. application No. 428,901, filed Jan. 29, 1965, there is disclosed a method of operating a process of this type wherein the regenerant fluid and fluid to be treated are liquids of different densities. According to this process, the more dense liquid is passed through the bed from the bottom and the less dense liquid is passed through the bed from the top. The liquids are alternately passed through the bed, the more dense liquid being at least partly displaced from the bed at the bottom of the bed by the less dense liquid, and the less dense liquid being at least partly displaced from the bed at the top of the bed by the more dense liquid.

The bed described in that application has an upper and a lower inlet at the top and bottom of the bed. A solution to be treated is passed into the bed through one of the inlets and at least part way through the bed, and a regenerant solution is passed into the bed through the other inlet and at least part way through the bed. The amount of solution to be treated passed into the bed is sufficient to displace from and actually displaces from the bed at least part of the regenerant solution previously passed into the bed, and to at least partially exhaust the capacity of the bed. The amount of regenerant solution passed into the bed is sufficient to displace from and actually displaces from the bed at least part of the solution to be treated previously passed into the bed, and sufficient to at least partially regenerate the bed. At least a part of each of the solutions passes out of the bed at the same end of the bed from which it enters the bed.

The use of this method avoids the use of rinse steps and is particularly suitable for use with the present invention. The elimination of the rinse steps reduces the total time of the cycle without increasing the time of the fluid treatment step and makes possible a further increase in the average rate of transfer per unit volume of bed particles over the whole cycle.

In some cases either or both of the fluids may not be passed through the complete length of bed available. However, it is to be understood that the expressions bed and length of bed used herein and in the appended claims refers to the length of the bed through which the fluid in question is passed.

The present invention is applicable to processes using absorptive particles such as charcoal, silica gel or activated alumina. In some absorptive processes the fluid which has been termed herein the regenerant is referred to as the stripping fluid and what has been termed herein the regeneration step is termed the stripping step. However, it is to be understood that the terms regenerant and regeneration step are to be construed as including stripping fluid and stripping step.

The principal application of the invention is to ion exchange processes. In an ion exchange process mobile hydrated ions of the bed material are exchanged, equivalent for equivalent, for ions of like charge in liquids passing through the bed. The bed material has an open fishnet-like structure, and the mobile ions electrically neutralize charged, or potentially charged groups attached to the solid matrix called the ion exchanger. Cation exchange occurs when the fixed charged groups (functional groups) of the exchanger are negative, and anion exchange occurs where the immobilized functional groups are positive.

Ion exchange processes are used for purification (water softening or de-mineralization), recovery (acid from pickle liquors), separation or fractionation of valuable species (rare earth metals), and for concentration of solutions.

Examples of cation exchangers are: carbonaceous exchangers including sulfonated coals and resinous exchangers containing sulfonic acid groups, carboxylic acid groups or phenolic groups. Examples of anionic exchangers are those of the type described in United States Patents Nos. 2,198,874, 2,259,169, 2,354,671, 2,246,527, 2,151,883, 2,362,086, 2,402,386, 2,341,907 and 2,251,234 and which include, for example, resins made by condensing aromatic polyamines and aldehydes with or without carbohydrates and with or without ketones, and aliphatic polyalkylene polyamines with aldehydes and ketones with or without phenols.

One of the principal applications of ion exchange processes is to the removal from water of scaling components such as calcium and magnesium. Ion exchange processes may be used to soften tap water and to soften brackish water or sea water prior to the recovery of fresh water by evaporative techniques.

Tap water containing 75 to 600 parts per million hardness expressed as calcium carbonate has been successfully treated by the process of this invention to obtain 99.9 percent removal of scaling components or "zero hardness" with a resin volume of from 5 to 15 percent of that used with conventional operations. For this operation it is preferred to use strong acid cation exchange resins such as the polystyrene sulfonic acid exchanger sold under the trade mark "DOWEX 50," an aqueous sodium chloride regenerant solution, a bed length of about 1 to 3 inches, a resin particle size of about 50 to 200 U.S. Tyler mesh, a fluid treatment step of about 1 to 2 minutes at a flow rate of about 15 to 40 U.S. gallons/minute/square foot, and a regeneration step of about 10 to 60 seconds at about 2 to about 18 U.S. gallons/minute/square foot.

With the process of the present invention it was possible to remove 70 to 95 percent of the calcium and 45 to 75 percent of the magnesium from typical sea water solutions using 0.5 to 1.0 percent of the resin volume which would be required by the conventional processes. For this operation it is preferred to use strong acid cation exchange resins such as the polystyrene sulfonic acid exchanger sold under the trade mark "DOWEX 50," an aqueous sodium chloride regenerant solution, a bed length of about 2 to 6 inches, a resin particle size of about 50 to 200 U.S. Tyler mesh, a flow rate for the fluid treatment and regeneration steps of about 3 to 15 U.S. gallons/minute/square foot and a time for each of the regeneration and fluid treatment steps of about ½ to 4 minutes.

For any given system it will be necessary to adjust the flow rate, time and bed length until at least 50 percent of the length of the bed in contact with the fluid being passed through the bed is actively taking up component from the fluid to be treated or actively giving up component to the regenerant fluid. Suitable bed lengths, flow rates and times for some systems are given above and in the following examples. For other systems the process will as indicated above be carried out at much shorter cycle times using much shorter beds and generally also at higher flow rates than in conventional processes, and it will be possible to determine when optimum conditions have been achieved by analyzing the composition of the bed at the end of the regeneration and fluid treatment steps.

This can be done by taking the bed material out of the column in fractions and analyzing the concentration of component in each fraction. The saturation composition with respect to each of the fluids to be treated and regenerant fluid can be determined, and it will be possible to make a plot similar to FIGURE 3 for any system. Such a plot will show the change in concentration between the fluid treatment and regeneration steps, and the length of the bed in which the bed is actively taking up component from the fluid to be treated or giving up component to the regenerant fluid can be determined from such a plot.

The following examples illustrate applications of the process of this invention. Example 1 relates to the treatment of sea water and Example 2 to the treatment of tap water.

Example 1

A glass tube of approximately 1.22 inches internal diameter was filled to a depth of about 4.0 inches with water wet and swollen granular cation exchange resin ("DOWEX 50") in sodium form having 12 percent divinyl benzene. The ion exchange resin in its wet form was composed of rounded granules of from 100 to 200 mesh per inch size as measured with standard Tyler screens. The length of the glass tube was sufficient only to accommodate the resin, a retaining screen and a rubber stopper at each end. Both rubber stoppers were provided with a single round opening and a glass baffle covering the opening approximately 0.68 inch in diameter, 0.12 inch thick and 0.12 inch away from the inside face of the stopper.

The external valving, consisting of two, three-way solenoid valves connected to the bottom outlet and one three-way solenoid valve connected to the top outlet. The valves were operated by suitable electronic relay system so that the sea water to be treated could be passed into the tube through the top outlet and a regenerant solution from a regenerant reservoir could be passed into the tube through the bottom outlet. The sea water to be treated had an original hardness of 108.0 meq./litre consisting of 89.6 meq./litre magnesium and 18.4 meq./litre calcium. A brine solution having a total cation content of 2340 meq./litre and a total hardness of 223.9 was used as regenerant.

Sea water and regenerant solution were alternately passed into the tube, the sea water entering from the top of the tube and the regenerant entering from the bottom of the tube. The system was operated so that a portion of each fluid was allowed to flow completely through the bed in one direction only, while the portion of either fluid remaining in the tube when the flow of that fluid was stopped was reciprocated and displaced from the column by the other fluid.

On each cycle sea water was passed through the bed from the top and regenerant was passed through the bed from the bottom. The sea water passing through the bed from the top displaced from the bed at the bottom of the bed the regenerant remaining in the bed from the previous cycle. The displaced regenerant passed to the regenerant reservoir along with a minor amount of sea water contaminated with regenerant which served as diluent for the regenerant. Additional sea water passed through the tube was collected as treated solution. After an amount of treated solution had been collected, regenerant from the regenerant reservoir was passed up the tube displacing from the bed at the top of the bed the sea water remaining in the bed. An additional amount of regenerant was allowed to pass out the top of the bed to exhaust along with the displaced sea water. The cycle was then repeated. Additional regenerant was added to the regenerant reservoir throughout the operation.

Flows were metered volumetrically by the use of electric level sensing contacts in reservoirs. These metering reservoirs emptied automatically by the use of solenoid drain valves connected electrically to the operation of the resin bed. The complete operation was automatic.

The system was operated at a downward flow rate for the sea water discharge of 7.12 U.S. gallons per minute per square foot and a downward flow rate for the regenerant to the regenerant reservoir of 7.12 U.S. gallons per minute per square foot. The upward flow rate for the regenerant was 5.0 U.S. gallons per minute per square foot, and the total cycle time was 85 seconds.

At this rate of flow and cycle time, each cycle resulted in 150 cc. treated sea water, 13.0 cc. sea water as diluent for the regenerant, 88.5 cc. of exhaust regenerant and sea water, and 38.0 cc. fresh regenerant added to reservoir. The calcium hardness of the sea water treated was reduced by 89 percent and the magnesium hardness by 55 percent. The regenerant had a total hardness of 223.9 and the exhaust solution a total hardness of 268.

The bed was analyzed after regeneration and after sea water treatment and the plot shown in FIGURE 4 of the $Mg^{++}+Ca^{++}$ concentration against the length of the bed was made from the results of this analysis. It can be seen that the profile extends substantially the length of the bed and that, substantially the whole length of the bed in contact with the fluid being passed through the bed was actively taking up these components during the fluid treatment step and actively giving up the components during the regeneration step.

Example 2

The same apparatus and flow arrangements used in Example 1 was used to treat tap water using a bed depth og 1⅛ inches. The tap water treated had a total hardness of 2.70 meq./litre and an aqueous sodium chloride solution having a chlorine content of 2013 meq./litre was used as regenerant.

The system was operated at a downward flow rate for the tap water discharge of 25.0 U.S. gallons per minute per square foot and a downward flow rate for the regenerant to the regenerant reservoir of 25.0 U.S. gallons per minute per square foot. The upward flow rate for the regenerant was 8.58 U.S. gallons per minute per square foot, and the total cycle time was 115.7 seconds.

At this rate of flow and cycle time each cycle resulted in 69.5 cu. inches treated tap water, 4.24 cu. inches tap water as diluent for the regenerant, 5.21 cu. inches exhaust regenerant and sea water, and 0.155 cu. inches fresh regenerant added to the regenerant reservoir. The tap water hardness was reduced to "zero hardness."

The bed was analyzed after regeneration and after tap water treatment, and the plot shown in FIGURE 5 of the total hardness concentration against the length of the bed was made from the results of this analysis. It can be seen that in this example also, substantially the whole length of the bed was actively taking up the hardness components during the fluid treatment step and actively giving up these components during the regeneration step.

What I claim as my invention is:

1. A process of treating a fluid containing a component to remove at least a part of the component from the fluid by passing the fluid through a fixed bed of particles capable of taking-up the component from the fluid comprising, a series of cycles, each cycle including a fluid treatment step in which the fluid to be treated is passed through the bed and a regeneration step in which a regenerant fluid capable of taking-up the component from the bed is passed through the bed, at least one of the fluid treatment step and regeneration step being carried out at a rate of flow and for a period of time such that, in the case of the fluid treatment step, at least 50 percent of the length of the bed in contact with the fluid to be treated is actively taking-up the component from the fluid to be treated throughout the step, and in the case of the regeneration step, at least 50 percent of the length of the bed in contact with the regenerant fluid is actively giving-up the component to the regenerant fluid throughout the step.

2. A process as claimed in claim 1, wherein the fluid treatment step is carried out at a rate of flow and for a period of time such that at least 50 percent of the length of the bed in contact with the fluid to be treated is actively taking-up the component from the fluid to be treated throughout the step, and the regeneration step is carried out at a rate of flow and for a period of time such that at least 50 percent of the length of the bed in contact with the regenerant fluid is actively giving-up the component to the regenerant fluid throughout the step.

3. A process as claimed in claim 2, wherein the regenerant fluid and fluid to be treated are passed through the bed vertically.

4. A process as claimed in claim 3, wherein the regenerant fluid and the fluid to be treated are passed through the bed in opposite directions.

5. A process as claimed in claim 4, wherein both the fluid to be treated and the regenerant fluid are liquids.

6. A process as claimed in claim 5, wherein the bed is less than two feet in length.

7. A process as claimed in claim 6, wherein the fluid treatment step is carried out at a rate of flow and for a period of time such that at least 75 percent of the length of the bed in contact with the fluid to be treated is actively taking-up the component from the fluid to be treated throughout the step, and the regeneration step is carried out at a rate of flow and for a period of time such that at least 75 percent of the length of the bed in contact with the regenerant fluid is actively giving-up the component to the regenerant fluid throughout the step.

8. A process as claimed in claim 7, wherein the bed is less than six inches in length.

9. A process as claimed in claim 8, wherein the bed particles are of a size of from about 50 to about 200 U.S. Tyler mesh.

10. A process as claimed in claim 9, wherein one of the regenerant fluid and fluid to be treated is more dense than the other, the more dense fluid is passed through the bed from the bottom and the less dense fluid is passed through the bed from the top, the fluids being alternately passed through the bed so that the more dense fluid is at least partly displaced from the bed at the bottom of the bed by the less dense fluid, and the less dense fluid is at least partly displaced from the bed at the top of the bed by the more dense fluid.

11. A process as claimed in claim 10, wherein the fluid treatment step is carried out at a rate of flow and for a period of time such that substantially the whole of the length of the bed in contact with the fluid to be treated is actively taking-up component from the fluid to be treated throughout the step, and the regeneration step is carried out at a rate of flow and for a period of time such that substantially the whole of the length of the bed in contact with the regenerant fluid is actively giving-up the component to the regenerant fluid throughout the regeneration step.

12. A process as claimed in claim 9, wherein the bed particles are ion exchange resin particles, the component is an ion, and the ion is exchanged for an ion of like charge on the resin during the fluid treatment step and for an ion of like charge in the regenerant fluid during the regeneration step.

13. A process as claimed in claim 12, wherein the fluid to be treated is water, the bed particles are sodium cation exchange resin particles, the component is at least one cation selected from the group consisting of calcium and magnesium, the regenerant fluid is an aqueous sodium chloride solution, and the component is exchanged for sodium ions of the resin during the fluid treatment step and for sodium ions of the regenerant fluid during the regeneration step.

14. A process as claimed in claim 13, wherein the fluid to be treated is tap water containing from 75 to 600 parts per million hardness expressed as calcium carbonate, the bed is from about one to about three inches in length, the fluid treatment step is carried out at a flow rate of about 15 to about 40 U.S. gallons per minutes per square foot and for a time of from about 1 to about 2 minutes, and the regeneration step is carried out at a flow rate of from about 2 to about 18 U.S. gallons per minute per square foot and for a time of from about 10 to about 60 seconds.

15. A process as claimed in claim 14, wherein the fluid to be treated is passed through the bed from the top and the regenerant fluid is passed through the bed from the bottom, the fluids being alternately passed through the bed so that the regenerant fluid is at least partly displaced from the bed at the bottom of the bed by the fluid to be treated, and the fluid to be treated is at least partly displaced from the bed at the top of the bed by the regenerant fluid.

16. A process as claimed in claim 15, wherein the fluid treatment step is carried out at a rate of flow and for a period of time such that substantially the whole of the length of the bed in contact with the fluid to be treated is actively taking-up the component from the fluid to be treated throughout the step, and the regeneration step is carried out at a rate of flow and for a period of time such that substantially the whole of the length of the bed in contact with the regenerant fluid is actively giving-up the component to the regenerant fluid throughout the step.

17. A process as claimed in claim 13, wherein the fluid to be treated is sea water, the bed is from about 2 to about 6 inches in length, and each of the regeneration and fluid treatment steps is carried out at a flow rate of from about 3 to about 15 U.S. gallons per minute per square foot and for a period of time from about ½ to about 4 minutes.

18. A process as claimed in claim 17, wherein the fluid to be treated is passed through the bed from the top and the regenerant fluid is passed through the bed from the bottom, the fluids being alternately passed through the bed so that the regenerant fluid is at least partly displaced from the bed at the bottom of the bed by the fluid to be treated, and the fluid to be treated is at least partly displaced from the bed at the top of the bed by the regenerant fluid.

19. A process as claimed in claim 18, wherein the fluid treament step is carried out at a rate of flow and for a period of time such that substantially the whole of the length of the bed in contact with the fluid to be treated is actively taking-up the component from the fluid to be treated throughout the step, and the regeneration step is carried out at a rate of flow and for a period of time such that substantially the whole of the length of the bed in contact with the regenerant fluid is actively giving-up the component to the regenerant fluid throughout the step.

References Cited

UNITED STATES PATENTS

| | | | |
|---|---|---|---|
| 2,484,647 | 10/1949 | Roberts | 210—35 |
| 2,503,769 | 4/1950 | Roberts | 210—290 X |
| 2,763,607 | 9/1956 | Staverman | 210—290 X |

SAMIH N. ZAHARNA, *Primary Examiner.*